INVENTOR.
CHARLES J. FRANK
BY
ATTORNEY 3,196,917
FROZEN-FOOD CUTTER
Charles J. Frank, Walton Hills, Ohio, assignor to Dolphin
Seafoods, Inc., Cleveland, Ohio, a corporation of Ohio
Filed May 16, 1963, Ser. No. 280,960
3 Claims. (Cl. 146—169)

This invention relates to machines for cutting frozen foods, and more particularly, to a machine for cutting slabs of frozen fish into portion sizes.

Therefore, it is an object of this invention to provide a machine into which slabs of frozen fish may be loaded and through which such slabs will be conveyed and cut into predetermined preselected portion sizes for breading and packaging.

The handling and packaging of frozen foods has developed into an important industry, and the handling of frozen fish has become an extensive part of that industry. In order to provide the consumer with a readily usable food item, it is preferable to have the fish product packaged in individual portions ready for final cooking. The desired portion size, as well as shape, is obtained by first freezing fish, in the form of a block, for ease of shipping and handling in bulk.

In the processing and packing operation, the blocks of fish are first cut into slabs, and the slabs are further cut into portion pieces having a size approximately four inches long, two and one-half inches wide, and one-half inch thick. This is the food item commonly found on restaurant menus as fish-sticks.

It is common practice to cut the block of fish by the utilization of meat saws which are inherently wasteful, in that the sawing of the fish results in the production of a certain percentage of "sawdust" which cannot be avoided when using the sawing process. The amount of this loss is in the range of five to eight percent, which is a material addition to the cost of producing the fish product for the ultimate consumer. This sawing process has become standard in the industry over a great number of years, although it was well-known that serious losses were occurring which were not beneficial to the finished product.

The machine disclosed herein as the preferred embodiment of my invention is capable of forming the preselected fish portions from slabs of fish without the disadvantages of the previously accepted processes and machines, as above set forth. The food-cutting machine of my invention utilizes a plurality of knives for achieving the separation of the frozen slabs of fish into portion-size pieces instead of the saw blade with the attendant kerf. The cutting of the fish, therefore, is accomplished without any loss by eliminating completely the saw kerf. Further, it is possible to gang knife blades and achieve a plurality of cuts simultaneously, which further reduces the cost of production of the frozen-fish product. The machine is also adapted to accept the slabs of frozen fish in a hopper and to automatically handle the fish and cut it into predetermined sizes and transfer the pieces to a breading or packaging machine without manual assistance.

Accordingly, it is an object of this invention to provide a frozen-food cutting process in which the article to be cut is passed by a plurality of stationary knives which successively produce partial cuts through the slab of frozen foods, the final cut separating the slab into pieces of predetermined size and shape.

A further object of this invention is to provide a machine wherein a plurality of knives, in successive staggered relation, engage a frozen slab of fish and produce cuts therein which coincide to separate the slabs of fish into pieces as required for breading or packaging.

Another object of this invention is to provide a machine wherein slabs of fish are fed automatically to a pusher apparatus reciprocably driven to urge the slabs of fish through a space between confronting knife-holders in which a plurality of knives successively produce cuts in the slab, the final knife completing the cut to obtain pieces of predetermined size and shape.

Other objects and advantages more or less ancillary to the foregoing, and the manner in which all of the various objects are realized, will appear in the following description, which, considered in connection with the accompanying drawings, sets forth the preferred embodiment of the invention.

Figure 1:
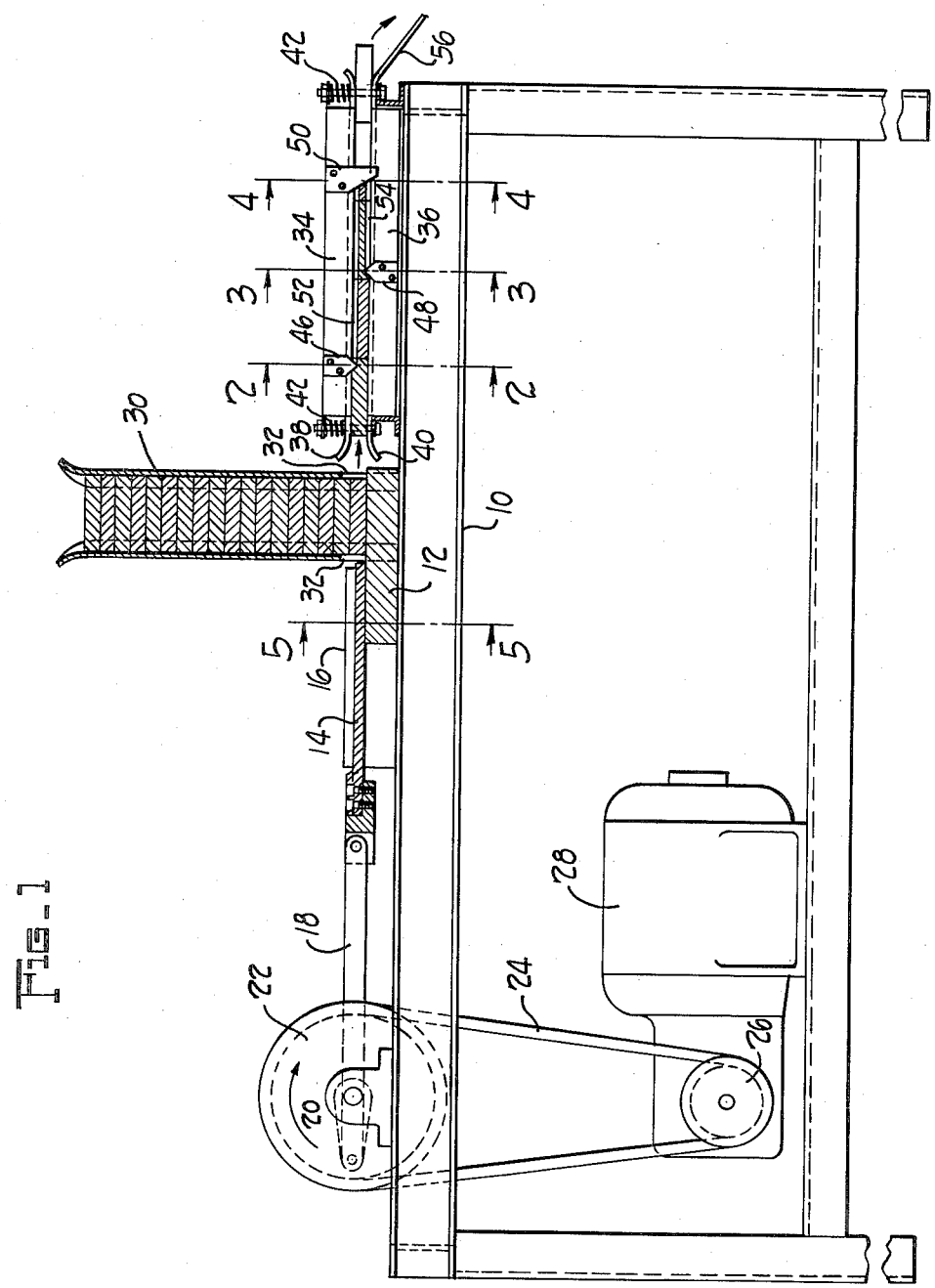
FIG. 1 is an elevational side view of the fish-cutting machine which forms the preferred embodiment of my invention.

Referring first to FIG. 1, the numeral 10 denotes the frame or support structure which carries the various components of the subject apparatus at a level convenient for the operators. A slide support block 12 is carried by the frame 10 and slidably supports for reciprocation a pusher plate 14. The pusher plate 14 extends across the width of the block 12 and is held in its normal path of travel by hold-down guides 16 at each side thereof.

The pusher plate 14 is reciprocated by a connecting rod 18 pivotally joined to the plate 14 at one end and to a crank 20 at the opposite end. The crank 20 is journaled for rotation and is driven by pulley 22 over which a belt 24 runs. The belt 24 is driven by a pulley 26 which is mounted on the drive shaft of a motor and speed-reduction gear 28 which provides the motive power required for actuating the pusher plate. Suitable power supply and controls therefore are provided for the motor in a well known manner.

A hopper 30 is mounted above the block 12 and is arranged to receive a slab of frozen fish at the upper end thereof and allow said slabs to gravitate to the block 12 at which point the lowermost slab is contacted by the pusher plate 14. Openings 32 in the hopper 30 are provided for the ejection of the slab of fish and for the passage therethrough of the pusher plate 14. As the pusher plate 14 reciprocates through a cycle, the lowermost slab of fish is ejected and upon the return of the pusher plate 14 to the position shown in FIG. 1, the following slab of fish drops onto the block 12 and is in position for ejection upon the next succeeding cycle of the pusher plate operation.

The frame 10 carries an upper knife-holder 34 and a lower knife-holder 36. Knife-holders 34 and 36 are spaced apart with the space therebetween being in opposed relation with the openings 32 at the lower end of the hopper 30. Knife-holders 34 and 36 have flared ends 38 and 40 respectively which serve to guide the slabs of frozen fish into the space between the knife-holders 34 and 36 as the pusher plate 14 ejects the slabs of fish from the hopper 30. Spring assemblies 42 serve to bias the knife-holders toward each other and thereby firmly hold the slabs of fish as they pass therebetween.

Spacer blocks 44 are positioned between the knife-holders 34 and 36 and have a thickness slightly less than the thickness of the slabs of fish thus allowing the fish to be readily introduced between the knife-holders and having no further effect to offset the biasing of the spring assemblies 42.

Figure 2:
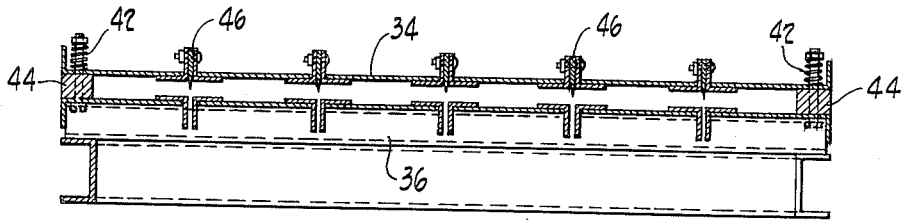
FIG. 2 is a sectional view taken along line 2—2 of FIG. 1.
Figure 3:
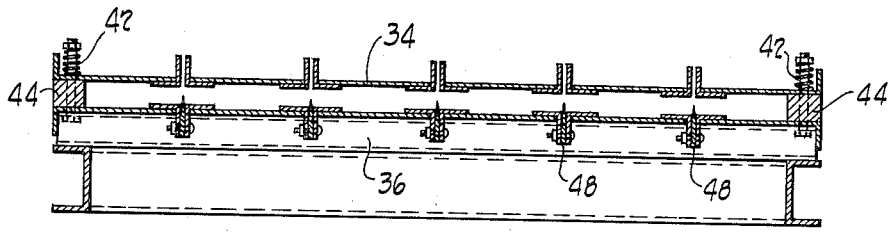
FIG. 3 is a sectional view taken along line 3—3 of FIG. 1.
Figure 4:
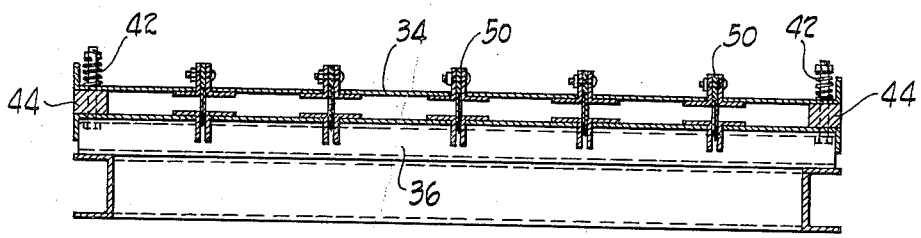
FIG. 4 is a sectional view taken along line 4—4 of FIG. 1.
Figure 5:
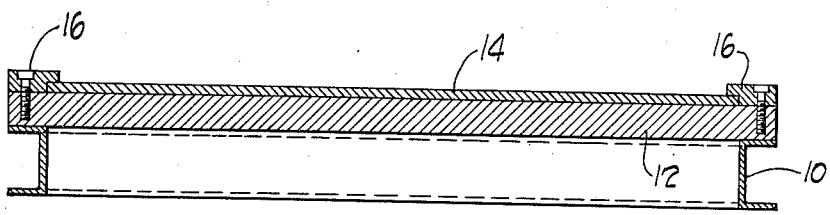
FIG. 5 is a sectional view taken along line 5—5 of FIG. 1.

In the illustration identified as FIG. 1, knives 46, 48 and 50 are shown as making a single cut entirely through the slab of fish. As illustrated in FIGS. 2 to 4 inclusive, a plurality of rows of knives may be ganged in the knife-holders 34 and 36 to simultaneously make a plurality of cuts with the result that a like number of finished cut pieces are ejected at each cycle of the pusher plate 14.

Knife 46, mounted on the upper knife-holder 34, is positioned to project into the space between the knife-holders 34 and 36 approximately one-third of the distance therebetween. As the slab of fish passes knife 46, a kerf 52 is made having a depth approximately one-third the thickness of the slab. Knife 48 mounted on lower knife-holder 36 projects upwardly into the space between the knife-holders 34 and 36 approximately one-third of the distance therebetween. Again, as the slab of fish passes knife 48 a kerf 54 is formed in the lower side of the slab of fish and extends into the slab approximately one-third of the thickness thereof. Knife 50 is mounted in the upper knife-holder as shown in FIG. 4 and has a blade of sufficient length to extend entirely across the space between the knife-holders 34 and 36. Knife 50 is positioned to follow kerfs 52 and 54 and to finish cut the remaining section of uncut slab lying between the kerfs 52 and 54. This uncut portion is approximately one-third of the thickness of the slab remaining after the previous cuts have been made.

Upon the passage of the slab through the knife-holder the slab is separated into portions having a width equal to the distance between the knives and these portions are ejected from the knife-holder and pass from the cutting section of the machine by gravity on a chute 56 to a breading or packaging machine as the case may be. As the pusher plate 14 is reciprocated, a slab of fish is urged into the knife-holder section at each cycle and is pushed by successive slabs through the space between the knife-holders. Simultaneously, the kerfs 52 and 54 are cut therein at successive points by the staggered knives. In this manner it is possible to sever the slab without breakage of the knives and without fracturing the pieces as they reach their final cuts.

Having thus described this invention in such full, clear, concise, and exact terms as to enable any person skilled in the art to which it pertains to make and use the same, and having set forth the best mode contemplated of carrying out this invention, we state that the subject which we regard as being our invention is particularly pointed out and distinctly claimed in what is claimed, it being understood that equivalents or modifications of, or substitutions for, parts of the above specifically described embodiments of the invention may be made without departing from the scope of the invention as set forth in what is claimed.

What is claimed is:

1. An apparatus for cutting frozen slabs of fish into portion size pieces comprising a pair of knife holders adjustably spaced for receiving said slabs of fish therebetween, a plurality of knives carried by the holders, one of said holders carrying a knife projecting into the space between the holders approximately one-third of the distance therebetween, a second knife carried by the other holder, said second knife being laterally disposed relative to the first knife and projecting into the space between the two holders approximately one-third of the distance therebetween, a third knife carried by said one holder having a length sufficient to span the space between the two holders and being disposed to pass through the kerf made by the said two knives and to finish cut the uncut part of the slab remaining between the two kerfs, thus separating the slab into pieces, and power actuated pusher means for urging the slab of fish against said knives and beyond said third knife.

2. An apparatus for cutting frozen slabs of fish into portion size pieces comprising a pair of knife holders adjustably spaced for receiving said slabs of fish therebetween, a plurality of knives carried by the holders, one of said holders carrying a knife projecting into the space between the holders approximately one-third of the distance therebetween, a second knife carried by the other holder, said knife being laterally disposed relative to the first knife and projecting into the space between the two holders approximately one-third of the distance therebetween, a third knife carried by said one holder having a length sufficient to span the space between the two holders and being disposed to pass through the kerfs made by the said two knives and to finish cut the uncut part of the slab remaining between the two kerfs, and separating the slab into pieces, pusher means for urging the slab of fish against said knives and beyond said third knife, and power means operably connected to said pusher means.

3. An apparatus for cutting frozen slabs of fish into portion size pieces comprising a pair of knife holders adjustably spaced for receiving said slabs of fish therebetween, a plurality of knives carried by the holders, one of said holders carrying a knife projecting into the space between the holders approximately one-third of the distance therebetween, a second knife carried by the other holder and projecting into the space between the two holders approximately one-third of the distance therebetween, a third knife carried by said one holder having a length sufficient to span the space between the two holders and being disposed to pass through the kerfs made by the said two knives and to finish cut the uncut part of the slab remaining between the two kerfs, and separating the slab into pieces, a pusher plate operable to urge the slab of fish against said knives and beyond said third knife, and power means operably joined to said pusher plate for reciprocating said plate.

References Cited by the Examiner

UNITED STATES PATENTS

| 1,248,540 | 12/17 | Peterson | 146—78 |
| 2,941,560 | 6/60 | McCaffery | 146—78 |

FOREIGN PATENTS

| 65,207 | 8/42 | Norway. | |

J. SPENCER OVERHOLSER, *Primary Examiner.*